US011424489B2

(12) United States Patent
Yebka et al.

(10) Patent No.: US 11,424,489 B2
(45) Date of Patent: Aug. 23, 2022

(54) BATTERY PHENOMENON MANAGEMENT VIA RESILIENT MATERIAL

(71) Applicant: Lenovo (Singapore) Pte. Ltd., Singapore (SG)

(72) Inventors: Bouziane Yebka, Apex, NC (US); Philip John Jakes, Durham, NC (US); Tin-Lup Wong, Chapel Hill, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/940,462

(22) Filed: Mar. 29, 2018

(65) Prior Publication Data
US 2019/0305380 A1 Oct. 3, 2019

(51) Int. Cl.
*H01M 10/0525* (2010.01)
*H01M 50/116* (2021.01)
(Continued)

(52) U.S. Cl.
CPC .......... *H01M 10/425* (2013.01); *H01M 4/13* (2013.01); *H01M 10/0525* (2013.01); *H01M 10/0583* (2013.01); *H01M 10/482* (2013.01); *H01M 50/116* (2021.01); *H01M 50/172* (2021.01); *H01M 50/20* (2021.01); *H01M 50/461* (2021.01); *H01M 50/593* (2021.01); *H01M 2004/027* (2013.01); *H01M 2004/028* (2013.01); *H01M 2010/4271* (2013.01); *H01M 2220/30* (2013.01)

(58) Field of Classification Search
CPC ...... H01M 2/026; H01M 2/06; H01M 2/1022; H01M 2/168; H01M 4/13; H01M 10/0525; H01M 10/0583; H01M 10/482; H01M 2004/027; H01M 2004/028; H01M 2010/4271; H01M 2220/30; H01M 50/116; H01M 50/461; H01M 50/172; H01M 50/20
See application file for complete search history.

(56) References Cited

U.S. PATENT DOCUMENTS

| 6,451,398 | B1 * | 9/2002 | Sylvester | C09J 7/29 428/41.8 |
| 6,451,474 | B1 * | 9/2002 | Kozu | H01M 2/1061 429/100 |

(Continued)

FOREIGN PATENT DOCUMENTS

| JP | 2002208385 A | * | 7/2002 |
| JP | 2016011859 A | * | 1/2016 |

OTHER PUBLICATIONS

"Noronha, Evan. "iPhone 6s Battery Replacement", Dec. 23, 2017. iFixit" (Year: 2017).*

(Continued)

*Primary Examiner* — Christopher P Domone
*Assistant Examiner* — Kimberly Wyluda
(74) *Attorney, Agent, or Firm* — Brian J. Pangrle

(57) ABSTRACT

A device can include a processor; memory accessible by the processor; a housing that includes a battery bay that includes a first surface and a second, opposing surface; a battery package disposed in the battery bay and operatively coupled to the processor; and a resilient material disposed between the battery package and at least one of the first surface and the second surface of the battery bay.

20 Claims, 12 Drawing Sheets

(51) Int. Cl.

| | |
|---|---|
| *H01M 50/46* | (2021.01) |
| *H01M 10/42* | (2006.01) |
| *H01M 10/48* | (2006.01) |
| *H01M 10/0583* | (2010.01) |
| *H01M 4/13* | (2010.01) |
| *H01M 50/20* | (2021.01) |
| *H01M 50/172* | (2021.01) |
| *H01M 50/593* | (2021.01) |
| *H01M 4/02* | (2006.01) |

(56) References Cited

U.S. PATENT DOCUMENTS

| | | | |
|---|---|---|---|
| 2009/0052130 A1* | 2/2009 | Hsieh | G06F 1/187 361/679.31 |
| 2010/0113636 A1 | 5/2010 | Van Rheenen et al. | |
| 2010/0143785 A1* | 6/2010 | Kwag | H01M 50/463 429/156 |
| 2013/0171487 A1* | 7/2013 | Bull | H01M 10/3909 429/99 |
| 2014/0160655 A1* | 6/2014 | Yebka | H01M 50/209 361/679.21 |
| 2017/0179517 A1* | 6/2017 | Stalder | H01M 10/0525 |

OTHER PUBLICATIONS

Suovanen, Jeff. "iPhone Battery Adhesive Strips Replacement, Dec. 16, 2017. iFixit" (Year: 2017).*
"iFixit Answer Forum, Feb. 2, 2018. iFixit" (Year: 2018).*
"3M VHB Tape 4624, Sep. 1, 2017. 3M" (Year: 2017).*
"Kaye. "Exchangeable Battery for iPhone 6S+/6+, iPhone 6S/6?", Jul. 26, 2016. ETradeSupply" (Year: 2016).*
EPO machine generated English translation of JP-2002208385-A (Year: 2002).*
RipItApart (Year: 2015).*
The Foam Factory (Shore Durometers: Measuring Foam's Hardness and Applying Its Values) (Year: 2011).*
EPO machine generated English translation of JP-2016-011859-A (Year: 2016).*
Townsend, Characterization and Lifetime Performance Modeling of Acrylic Foam Tape for Structural Glazing Applications, Virginia Polytechnic Institute and State University, MS Thesis, Sep. 12, 2008 (136 pages).
3M, VHB Tape Speciality Tapes, Nov. 2015 (9 pages).
3M, VHB Double Coated Acrylic Foam Tapes and Adhesives Transfer Tapes, Apr. 2001, 70-0709-3863-7 (1/02) (17 pages).
Marian, Durometer Comparison Chart, "Durometer—Shore Hardness Testing for Rubber, Plastic, and Foam Materials" (https://marianinc.com/durometer/), May 22, 2019 (1 page).
3M, VHB Tapes, Apr. 2014, 70070939874 (4/14) (2 pages).
Larson, Dow White Paper, Can you Estimate Modulus From Durometer Hardness for Silicones? (S90799/E26340, Form No. 11-3716-01 AS2D, 2019) (5 pages).
Saint-Gobain Performance Plastics Corporation, 2002, (AFF-1078-10M-0402 D&D) (7 pages).
Marian, Poron 4790-92 Extra Soft, 2003 (3049-0503.06C, Publication # 17-039) (2 pages).
Diversified Silicone Products, Inc., Silicone Foam & Sponge, 2005 (1 page).
Plan Tech, Durometer* Conversion Chart, https://plantech.com/convert-different-durometer-shore-types/ (1 page).
Lenovo, Hardware Maintenance Manual, ThinkPad Helix and Enhanced Keyboard Dock for ThinkPad Helix, Apr. 2013 (86 pages).
De Vries, Characterization of polymeric foams, Eindhoven University of Technology, Jul. 2009 (35 pages).

* cited by examiner

| 1010 | | Adhesive Foam Layer Compressibility | | | |
|---|---|---|---|---|---|
| | | Adhesive | | | |
| ε | χ | Comp. | α | Pack Thickness | 50% Comp. |
| 3.5 mm | 0.07 mm | 7.00% | 1.0 mm foam | 4.5 mm | 0.14 mm |
| | | 4.70% | 1.5 mm foam | 5.0 mm | |
| | | 3.50% | 2.0 mm foam | 5.5 mm | |
| 4.0 mm | 0.08 mm | 8.00% | 1.0 mm foam | 5.0 mm | 0.16 mm |
| | | 5.30% | 1.5 mm foam | 5.5 mm | |
| | | 4.00% | 2.0 mm foam | 6.0 mm | |
| 4.5 mm | 0.09 mm | 9.00% | 1.0 mm foam | 5.5 mm | 0.19 mm |
| | | 6.00% | 1.5 mm foam | 6.0 mm | |
| | | 4.50% | 2.0 mm foam | 6.5 mm | |
| 5.0 mm | 0.10 mm | 10.00% | 1.0 mm foam | 6.0 mm | 0.20 mm |
| | | 6.70% | 1.5 mm foam | 6.5 mm | |
| | | 5.00% | 2.0 mm foam | 7.0 mm | |
| 5.5 mm | 0.11 mm | 11.00% | 1.0 mm foam | 6.5 mm | 0.22 mm |
| | | 7.30% | 1.5 mm foam | 7.0 mm | |
| | | 5.50% | 2.0 mm foam | 7.5 mm | |

BATTERY PHENOMENON MANAGEMENT VIA RESILIENT MATERIAL

TECHNICAL FIELD

Subject matter disclosed herein generally relates to batteries and battery bays.

BACKGROUND

A battery can include one or more electrochemical cells. As an example, an electrochemical cell can be a lithium-ion cell. Such a cell may be installed in a battery bay of a device such as, for example, a computing device.

SUMMARY

A device can include a processor; memory accessible by the processor; a housing that includes a battery bay that includes a first surface and a second, opposing surface; a battery package disposed in the battery bay and operatively coupled to the processor; and a resilient material disposed between the battery package and at least one of the first surface and the second surface of the battery bay. Various other apparatuses, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing general principles of various implementations. The scope of invention should be ascertained with reference to issued claims.

Figure 1:
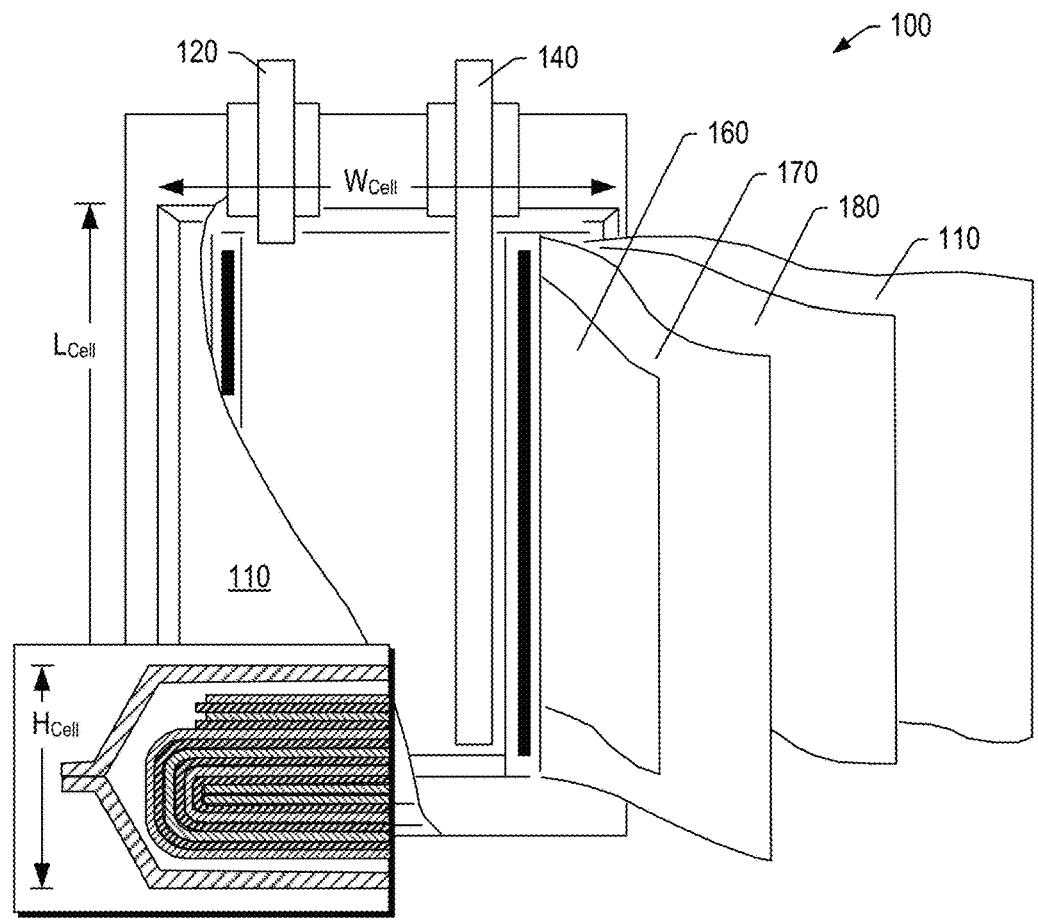
FIG. 1 is a diagram of an example of a battery and an example of circuitry.
Figure 1:
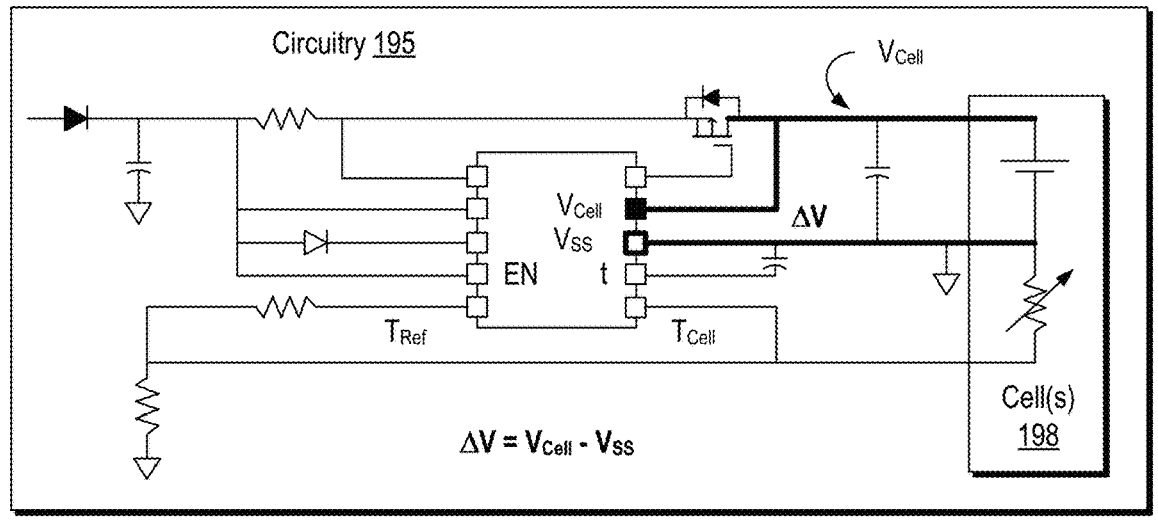

FIG. 1 shows an approximate cut-away view of an example of a battery 100 that includes a casing 110 and a positive tab 120 and a negative tab 140, for example, to operatively couple the battery 100 to circuitry. The casing 110 may include a cell region defined by a cell length ($L_{Cell}$), a cell width ($W_{Cell}$) and a cell height ($H_{Cell}$). As an example, the cell region may include one or more electrochemical cells. As an example, an electrochemical cell may be formed in part by a cathode 160, a separator 170 and an anode 180. Such components may be "folded", for example, to form a stack (e.g., "jelly roll") that may be housed in the cell region of the casing 110. As shown in the example of FIG. 1, in an approximate cross-sectional view, the height ($H_{Cell}$) of the cell region of the casing 110 may be defined in part by thicknesses of the cathode 160, the separator 170 and the anode 180 as well as, for example, by stacking of such components (e.g., winding in a roll or other configuration). As an example, a cathode formed of electrode material, an anode formed of electrode material and a separator formed of separator material along with collector materials may be layered and stacked, for example, by folding in a zigzag orientation, folding in a clockwise roll orientation, folding in a counterclockwise roll orientation, etc.

As an example, a cell can include an anode collector material that includes, for example, copper; an anode electrode material that includes lithium and carbon (e.g., $Li_yC$); a separator material configured for passage of lithium ions (e.g., in electrolyte); a cathode electrode material that includes lithium and metal oxide (e.g., $Li_{1-x}CoO_2$); and a cathode collector material that includes, for example, aluminum. While carbon, cobalt, copper and aluminum are mentioned, other materials may be employed to form a lithium-ion cell.

As to the terms "anode" and "cathode", these may be defined based on discharge, for example, where lithium ions migrate in a direction from a carbon-based matrix towards a metal oxide-based matrix. In other words, when a lithium-ion based cell is discharging, a positively charged lithium ion may be extracted from anode electrode material (e.g., graphite lattice) and inserted into cathode electrode material (e.g., into a lithium containing compound); whereas, when such a cell is charging, the reverse process may occur.

As an example, positive electrode material (e.g., cathode electrode material) may include $LiCoO_2$, $LiMn_2O_4$ or other compound. As an example, separator material may include a conducting polymer electrolyte (e.g. polyethyleneoxide "PEO", etc.). For example, a separator material may include polymer that provides for conduction of lithium ions (e.g., a lithium-ion conductive polymer material). As an example, negative electrode material (e.g., anode electrode material) may include ionizable lithium metal, a carbon-lithium intercalation compound, etc.

As an example, a lithium-ion battery may include one or more cells where each cell includes an anode, a cathode and electrolyte, which may be a polymeric material or provided in a polymeric matrix. As an example, a cell may include an anode electrode material that includes carbon, a cathode electrode material that includes a metal oxide, and a separator material that includes polymer.

As an example, active electrode particles may be for a cathode to form cathode electrode material. For example, consider particles that include one or more of lithium cobalt oxide ($LiCoO_2$), lithium nickel oxide ($LiNiO_2$), lithium manganese oxide ($LiMn_2O_4$), and lithium iron phosphate ($LiFePO_4$).

As an example, positive active electrode particles may include lithium and metal oxide, for example, represented by $Li_xM^1{}_yM^2{}_{1-y}O_2$ where $0.4 \leq x \leq 1$; $0.3 \leq y \leq 1$; $M^1$ is at least one selected from the group consisting of Ni and Mn; and $M^2$ is at least one selected from the group consisting of Co, Al, and Fe. As an example, positive active electrode particles may include lithium and metal oxide, for example, be represented by one of the following: $LiNi_xCo_yAl_zO_2$, where $0.7 \leq x \leq 1$; $0 \leq y \leq 0.3$; $0 \leq z \leq 0.03$; and $0.9 \leq x+y+z \leq 1.1$; $LiNi_xCo_yMn_zO_2$, where $0.3 \leq x \leq 0.6$; $0 \leq y \leq 0.4$; $0.3 \leq z \leq 0.6$; and $0.9 \leq x+y+z \leq 1.1$; $Li_xMn_zO_2$, where $0.4 \leq x \leq 0.6$; and $0.9 \leq z \leq 1$; or $LiFe_xCo_yMn_zO_2$, where $0.3 \leq x \leq 0.6$; $0.1 \leq y \leq 0.4$; $0.3 \leq z \leq 0.6$; and $0.9 \leq x+y+z \leq 1.1$.

As an example, active electrode particles may be for an anode to form anode electrode material. For example, consider particles that include one or more of carbon lithium and lithium titanate. As to lithium titanate, consider, for example: $Li_2TiO_3$; $Li_4TiO_{12}$; $Li_4Ti_5O_{12}$.

As an example, a cell may include electrolyte in a polymeric matrix. For example, consider an electrolyte that includes $Li(ClO_4)_2$ in polycarbonate/tetrahydrofuran (PC/THF) (e.g., about 0.4 M) or other polymeric matrix.

FIG. 1 also shows an example of circuitry 195 for managing one or more electrochemical cells 198. As an example, the circuitry 195 and the cell(s) 198 can be a battery assembly; noting that a battery assembly can include, alternatively or additionally, one or more other types of circuitry.

A charge rate and/or a discharge rate may be referred to as a C-rate and be specified using a numeric value followed by the capital letter "C". A C-rate specifies the speed a battery is charged or discharged. Speed may be relatively constant for an application(s), function(s), etc., or, for example, speed may vary with respect to time as application(s), function(s), etc., change. As to C-rate, at 1 C, a battery charges and discharges at a current that is on par with a marked Ah rating (e.g., as specified by a manufacturer, etc.). At 0.5 C, the current is half and the time is doubled, and at 0.1 C the current is one-tenth and the time is 10-fold.

The capacity of a battery may be rated with respect to a C-rate, for example, a battery rated at 1 C means that a fully charged battery rated at 1 Ah can be expected to provide 1 A for one hour (h). The same battery discharging at 0.5 C can be expected to provide 500 mA for two hours (2 h), and at 2 C, 2 A for 30 minutes (0.5 h).

As to the term load, it defines the current that is drawn from a battery. Internal battery resistance and depleting state of charge (SOC) can cause voltage to drop under load, which can in some instances trigger an end of discharge (e.g., termination of discharge or discharging). Power relates to current delivery measured in watts (W); energy is the physical work over time measured in watt-hours (Wh).

As to the terms specific energy and gravimetric energy density, these define battery capacity in weight (Wh/kg); whereas, the term volumetric energy density defines battery capacity with respect to volume in liters (Wh/l). As an example, a lithium ion battery may be of a volumetric energy density that is in a range of about 10 Wh/l to more than 1,000 Wh/l.

As mentioned, a cell (e.g., or cells) may be characterized, for example, as to specific energy (e.g., Wh/kg or MJ/kg), energy density (Wh/l or MJ/l), specific power (W/kg), etc. As an example, a region of a battery with one or more cells may include $L_{Cell}$ and $W_{Cell}$ dimensions (e.g., rectangular dimensions), for example, with a $L_{Cell}/W_{Cell}$ ratio in a range of about 1 to about 5. As an example, consider a cell (or cells) with dimensions of about 120 mm ($L_{Cell}$) by about 100 mm ($W_{Cell}$) where, in combination with a height ($H_{Cell}$), a volume ($Vol_{Cell}$) may be calculated. As an example, with a volume ($Vol_{Cell}$) and energy density (ED in Wh/l), an energy value (e.g., Wh) may be determined for the battery.

As an example, a battery with a volume of about 43 ml (~43,000 cubic mm) and a thickness ($H_{Cell}$) of about 3.6 mm (e.g., with $L_{Cell}$ and $W_{Cell}$ of about 120 mm and about 100 mm) may have an energy density of about 480 Wh/l. In terms of energy, such a battery may be capable of storing about 21 Wh, which may be sufficient to power 2.6 W circuitry for about 8 hours (e.g., circuitry operational time).

A cell or cells may be referred to as a lithium-ion battery or a lithium-ion polymer battery or a lithium-polymer battery (e.g., "LiPo battery" or "LiPo cell"). LiPo cells are sometimes referred to as laminate cells, which may be configured very thin or quite large depending on their intended use. One or more LiPo cells may be encased in a flexible aluminum foil laminate pouch (e.g., with a thickness of the order of about 0.1 mm; see, e.g., the casing 110 of the battery 100 of FIG. 1). LiPo cells may include a stacked construction formed by stacking materials that include electrode and electrolyte materials in a flat sandwich (e.g., defined by length, width and height dimensions). Stacked layers may be packed in a package (see, e.g., the casing 110 of FIG. 1) in a flat, rolled or other configuration. LiPo cell capacities may include capacities in a range, for example of about 50 mA·hrs (e.g., for a small cell such as for a Bluetooth headset) to about 10 A·hrs or more for an electric vehicle (e.g., electric or hybrid).

A package (e.g., a battery package) provided in a pouch format or a prismatic format may expand, for example, when the state-of-charge (SOC) level of a battery is high (e.g., overcharge) or when the SOC of a battery is low (over-discharge). A Li-ion battery may be managed to varying extent by management circuitry.

As to protection features, a cell temperature sensor bias feature (see, e.g., $T_{Ref}$ in the circuitry 195 of FIG. 1) may provide for a voltage reference to bias external thermistor for continuous cell temperature monitoring and prequalification while a cell temperature sensor input feature (see, e.g., $T_{Cell}$ in the circuitry 195 of FIG. 1) may provide for input for an external thermistor for continuous cell temperature monitoring and prequalification (optionally may be disabled by applying a set voltage) and safety timers (e.g., preconditioning, fast charge, elapsed time termination, etc.) may be scaled by a capacitor. A temperature-sensing circuit may have its own reference such that it is immune to fluctuations in the supply voltage input (e.g., where the temperature-sensing circuit is removed from the system when no supply is applied, eliminating additional discharge of cell(s)).

As to logic, a logic enable feature may provide for input that, for example, forces charge termination, initiates charge, clears faults or disables automatic recharge. For example, a logic-enable input pin (EN in the circuitry 195 of FIG. 1) may provide for features to terminate a charge anytime during the charge cycle, initiate a charge cycle or initiate a recharge cycle. A logic input (e.g., high or low) may signal termination of a charge cycle. A cell voltage sense can provide for monitoring voltage at, for example, a positive terminal of a cell (e.g., for single, dual, etc., series cell packs with coke or graphite anodes).

Management circuitry may be configured to manage, to varying extent, state-of-charge (SOC) mismatch and capacity/energy (C/E); noting that as the number of cells and load currents increase, the potential for mismatch also increases. Though SOC may be more common, each type of mismatch problem limits capacity (mA·h) of a pack of cells to capacity of the weakest cell.

While a LiPo cell package may be flexible, bending is generally to be minimized or avoided as bending brings the housed anode and cathode materials closer together, which can cause preferential plating and shorting, which can reduce cycle life and present a potential safety hazard.

Various phenomena can cause gassing or gas expansion of a LiPo cell package. For example, a puncture can cause an internal short circuit, which may cause the cell to get hot. Further, even if a cell does not short, a leak may allow moisture in, which may eventually cause self-discharge. A cell may also generate gas from reaction of an anode with moisture.

Another issue for LiPo packages can be edge shorting. Edge shorting can occur, for example, where an aluminum layer of a package is conducting and, if exposed at a cut edge of the package, can short out via contact with one or more neighboring components. Yet another issue is related to internal corrosion reactions in a cell, which can occur if tabs to an aluminum layer are shorted, which may happen, for example, if one or more tabs are bent over an edge of a package.

For LiPo cells, when cell voltage drops to a low value (e.g., about 1.5 V), reactions at an anode can produce gas (e.g., over-discharge). If voltage continues to drop (e.g., under about 1 V), copper of an anode current collector can start to dissolve and may short out a cell.

When cell voltage increases to a high value (e.g., about 4.6 V), gassing may occur at a cathode as electrolyte may start to decompose (e.g., overcharge). While a lithium ion (not LiPo) cylindrical cell may include an integral pressure-activated current-interrupt device (CID) to stop overcharge in response to gas pressure, conventional LiPo cells do not include a CID. Although swelling of a LiPo package may help to prevent further overcharge by increasing cell impedance, as a final failsafe, such a condition is suboptimal. Some LiPo cells may be connected to an external thermal fuse for overcharge protection (e.g., in addition to the control by management circuitry).

For lithium-ion cells, an external short circuit can cause swelling due to heat and over-discharge (e.g., too low of a cell voltage). Non-LiPo cylindrical cells can include an integral positive thermal coefficient (PTC), a device that expands and creates high impedance when it is heated or self-heats due to the high currents experienced during an external short circuit. Conventional LiPo cells do not include an integral PTC; noting that some LiPo cells rely on an external PTC or thermal fuse for shorting protection.

A lithium-ion battery can expand and/or contract responsive to various conditions. A lithium-ion battery may "breathe" and may "swell" where breathing and swelling may be viewed as two types of phenomena. As to breathing, it can be cyclic in that a battery can expand and contract. As to swelling, it can be trending in that a battery can expand and gradually increase in one or more dimensions (e.g., battery thickness). As an example, for a battery that has a substantially rectangular footprint and a manufactured thickness in a direction normal to a plane of the substantially rectangular footprint, during operation of the battery, breathing may occur that can be characterized as a breath percentage of the manufactured thickness and swelling may occur that can be characterized as a swell percentage of the manufactured thickness. In such an example, during the lifetime of use of the battery, the swell percentage can exceed the breath percentage.

Breathing and swelling phenomena can be taken into account when designing the height of a battery bay, where the height is in a direction of battery thickness. For example, a battery bay can have a height that is greater than the manufactured thickness of a battery such that expected increases in thickness of the battery (e.g., due to breathing and/or swelling) can be accommodated without having the battery exert force on a wall or walls of the battery bay that may cause damage to the wall or walls and/or cause damage to the battery. In some instances, where a battery fails and swells beyond expectations, a device that includes a battery bay as defined by opposing walls may be damaged. For example, a housing of a smart phone may become misshapen or split apart (e.g., at a seam, etc.).

In general, for mobile devices (e.g., mobile computing devices such as smartphones, tablets, laptops, etc.), a balance is struck between expected expansion and abnormal expansion. Such a balance tends toward expected expansion, particularly where a mobile device is to be "thin". For example, for a thin mobile device, a manufacturer is less likely to include space in a battery bay that accounts for abnormal expansion (e.g., expansion in thickness greater than 300 percent of the manufactured thickness of a battery) particularly because the risk of abnormal expansion may be quite low.

To account for "normal" swelling, a manufacturer of a mobile computing device can include a space that is of the order of two millimeters or more. Such a space may be referred to as a gap between a battery (e.g., a battery package) and a wall of a battery bay. For example, a battery bay may have a height of 6 mm for a battery that has a manufactured thickness of 3 mm. In such an example, the gap is 3 mm, which is 100 percent of the manufactured thickness of the battery. As an example, a battery may be disposed in a battery bay with two gaps, one to each side of sides that define a manufactured thickness of the battery. In such an example, consider a battery bay with a height of 9 mm and a battery with a manufactured thickness of 3 mm with a 3 mm gap to one side and a 3 mm gap to another side such that a total gap is of 6 mm (e.g., 200 percent of the manufactured thickness of the battery).

As to making a "thin" mobile computing device that is powered by a battery (or batteries), in the foregoing examples, the minimum thickness would be approximately 6 mm (for the single gap) or approximately 9 mm (for the double gap).

As an example, a battery bay and/or a battery (e.g., a battery package) can include a resilient material that can respond to breathing and/or swelling of the battery (e.g., the battery package). In such an example, a battery (e.g., a battery package) may be disposed in a battery bay without clearance (e.g., no gap or gaps) or with minimal clearance. In such an example, the resilient material may be in a partially compressed state such that an amount of force is applied to a battery (e.g., a battery package). As an example, an applied force (e.g., or load) may act to reduce the amount of swelling that occurs during an operational lifetime of a battery. For example, an applied load, as applied at least in part by a partially compressed resilient material, can reduce the amount of normal (e.g., expected) swelling of a battery during its operational lifetime in a battery bay of a device. In such an example, opportunities exist to manufacture a thinner device at least because swelling is reduced and/or because one or more gaps are reduced, where a reduction of a gap includes elimination of the gap. As an example, a gap or gaps may be eliminated by disposing one or more resilient materials between a side of a battery (e.g., a battery package) and a wall of a battery bay or between sides of a battery (e.g., a battery package) and respective walls of a battery bay.

Figure 2:
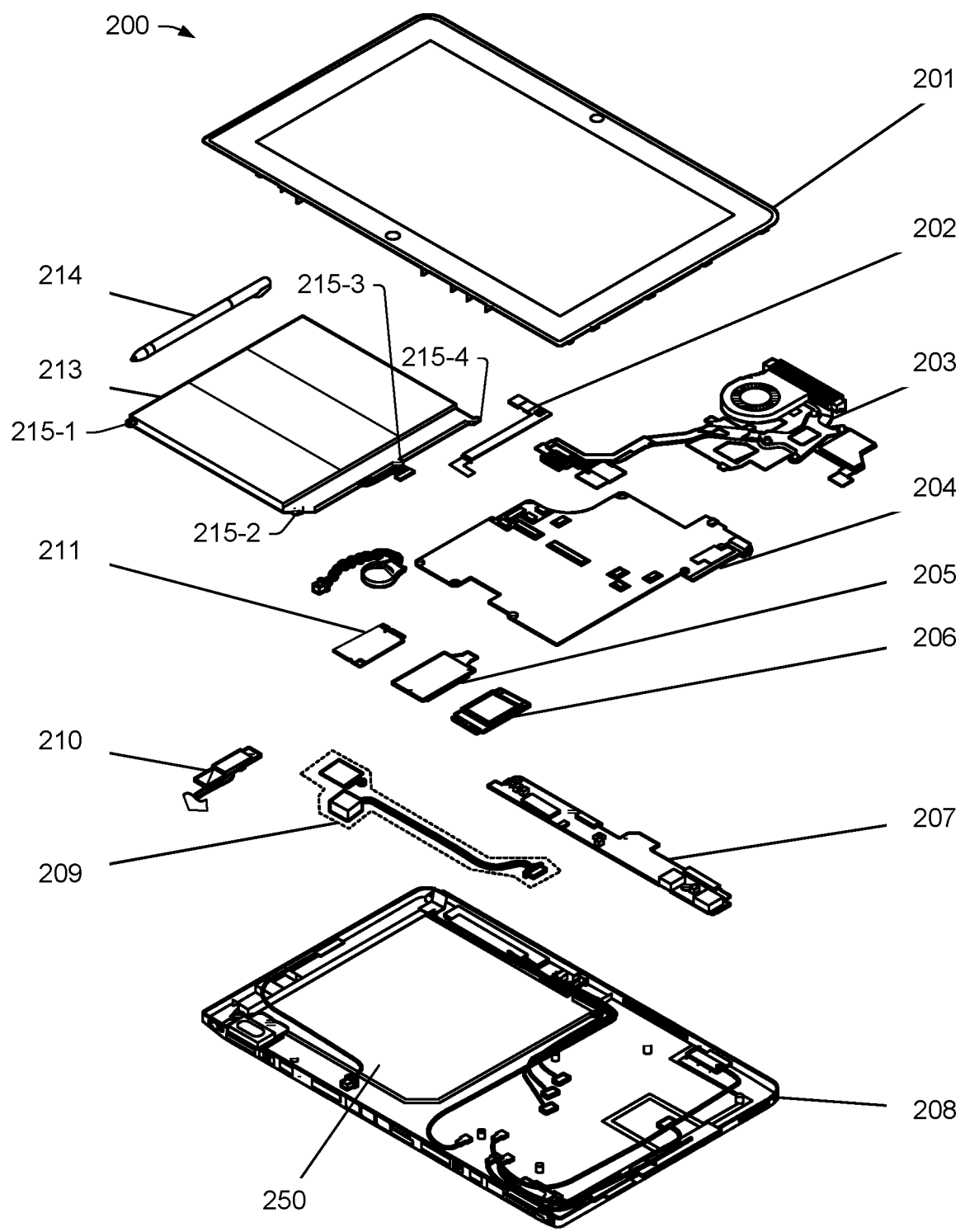
FIG. 2 is a diagram of various components of a device powered by one or more batteries.

FIG. 2 shows an example of a device 200 that includes an LCD assembly 201, a camera assembly 202, a fan assembly 203, a board 204 (e.g., a circuit board, a system board, a motherboard, etc.), a wireless WAN card 205, a wireless LAN card 206, an I/O board 207, a cover assembly 208, a DC cable assembly 209, a communication card 210, a solid-state drive 211, a battery package 213, a stylus 214 and a battery bay 250. In the example of FIG. 2, the board 204 may include a processor and memory, which may be configured to store instructions accessible by the processor and, for example, executable by the processor to perform one or more tasks. In the example of FIG. 2, the battery package 213 may include multiple cells. For example, the battery package 213 may include three sets of cells (e.g., or three cells) such that one is in the middle and surrounded by two others (e.g., two neighbors). In an assembled state, the battery package 213 can be disposed in the battery bay 250. As shown, the battery package 213 can include screw tabs 215-1 to 315-4 that extend outwardly from the battery package.

Figure 3:
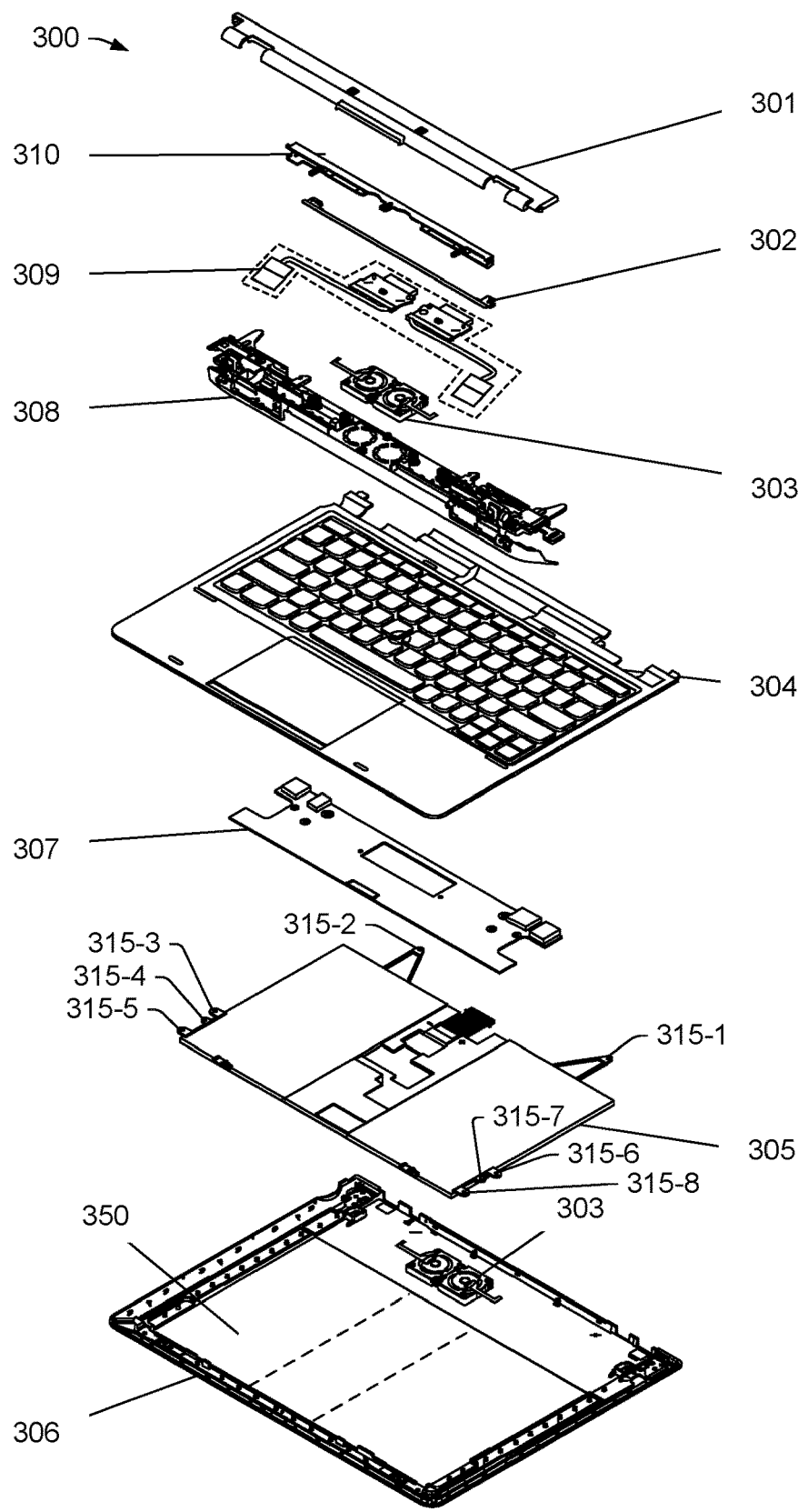
FIG. 3 is a diagram of various components of a device powered by one or more batteries.

FIG. 3 shows an example of a device 300. As an example, the device 300 may be operatively coupled to the device 200. In the example of FIG. 3, the device 300 includes a cover and hinge assembly 301, a link structure 302, a fan assembly 303, a keyboard assembly 304, a battery package 305, a base cover 306, an I/O board 307, a hinge assembly 308, connectors 309, a connectors cover 310, and a battery bay 350. In the example of FIG. 3, the battery package 305 may include multiple cells. For example, the battery package 305 may include two sets of cells (e.g., or two cells). In an assembled state, the battery package 305 can be disposed in the battery bay 350. As shown, the battery package 305 can include screw tabs 315-1 to 315-8 that extend outwardly from the battery package.

A battery package can be secured to a housing via an adhesive material. For example, in FIG. 2, the battery package 213 can be secured in the battery bay 250 by adhesive that binds to the battery package 213 and to the cover assembly 208; and, in FIG. 3, the battery package 305 can be secured in the battery bay 350 by adhesive that binds to the battery package 305 and to the base cover 306. In such examples, the cover assembly 208 can be or include a housing wall and the base cover 306 can be or include a housing wall.

An adhesive can be a substance that is applied to a surface of a component to bind the component to a surface of another component. As an example, an adhesive may be applied to a surface of one component and a surface of another component to bind the surfaces together. As an example, an adhesive or adhesives may be at an interface between two components. As an example, a component may be a substrate with respect to an adhesive, for example, an adhesive can bond two substrates.

As an example, a stack may be defined by materials and components. For example, a stack may include a wall, adhesive, a resilient material, adhesive and a battery. In such an example, the stack may further include a resilient material disposed between the battery and another wall. In such an example, one or both of the resilient materials may be in a partially compressed state such that a load is applied to the battery. Where a load is applied, a gap may not exist, where such a gap is defined to be a "clear" gap that, for example, would cover at least 95 percent or more of the area of a side of the battery. Such a clear gap differs from gaps that may exist where a resilient material is in the form of a mesh. For example, a resilient material may have dimensions (e.g., an outer perimeter) that define a coverage area where, within that coverage area, gaps may exist as openings in the mesh. Such openings may help to facilitate heat transfer where, for example, the resilient material has particular thermal conduction properties that may hinder transfer of heat energy away from (e.g., or to) a battery. A mesh approach to a resilient material can allow for adequate loading of a battery where desired. For example, consider a resilient material in the form of a mesh that has width and length dimensions of the order of centimeters and a plurality of openings of the order of millimeters. Such a mesh may be utilized in a filling manner to eliminate a clear gap as to a battery in a battery bay of a device.

Various examples may be defined with respect to a stack. As an example, a stack can include at least one resilient material that has a coverage of at least 50 percent of a side of a battery (e.g., a battery package) as disposed in a battery bay of a device. As an example, a stack can be defined at least in part by the battery bay 250 and the battery package 213 of FIG. 2 and a stack can be defined at least in part by the battery bay 350 and the battery package 305 of FIG. 3. In such examples, the cover assembly 208 may define a portion of the stack in FIG. 2 and the base cover 306 may define a portion of the stack in FIG. 3. In such examples, the LCD assembly 201 may define a portion of the stack in FIG. 2 and the keyboard assembly 304 and/or the I/O board 307 may define a portion of the stack.

Figure 4:
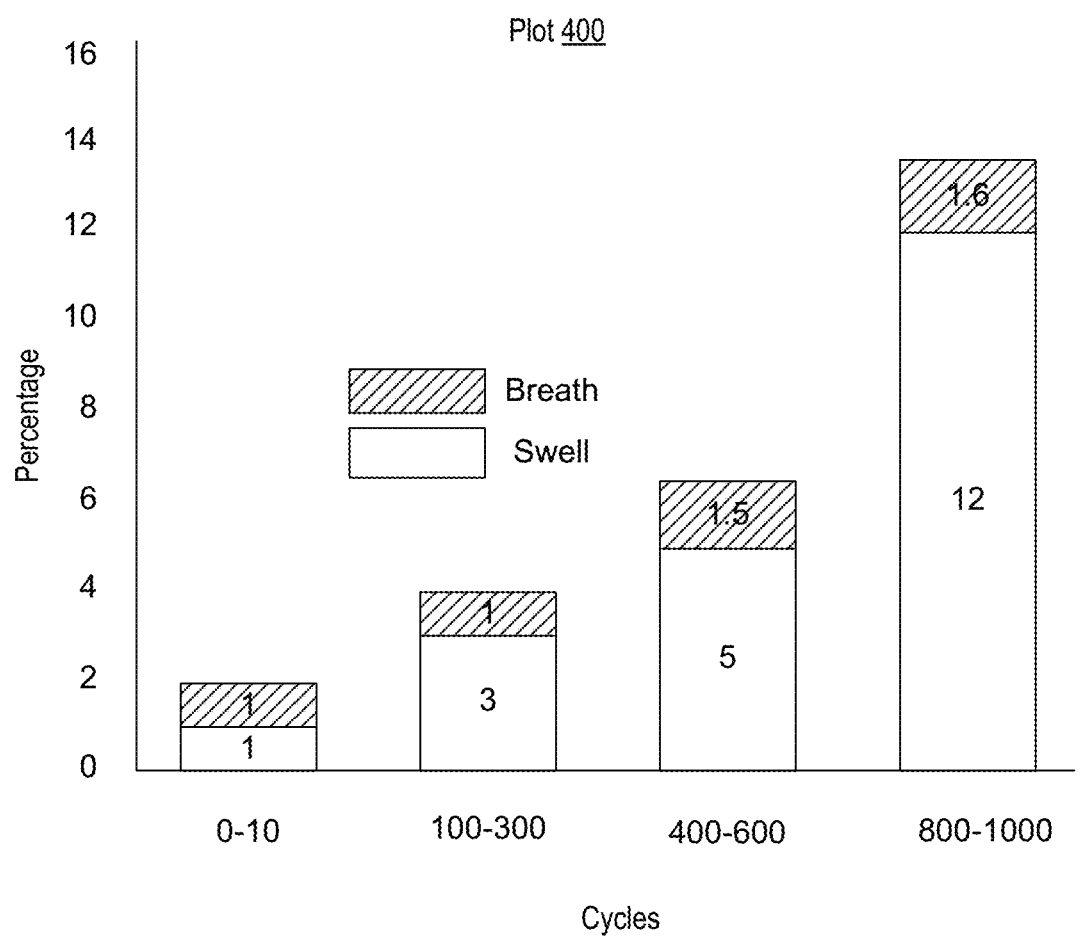
FIG. 4 is a diagram of a plot of breathing and swelling phenomena.

FIG. 4 shows an example plot 400 of percentage of manufactured thickness of a battery versus cycles where the percentage is broken into two types, breathing and swelling. As shown, as cycle number increases (e.g., charge and discharge cycle), the swelling as a percentage of manufactured thickness of the battery trends upward from 1 percent for 0 to 10 cycles, to 3 percent for 100 to 300 cycles, to 5 percent for 400 to 600 cycles, to 12 percent for 800 to 1000 cycles. As shown, the percentage of manufactured thickness increase attributed to breathing trends slightly upward and to a lesser extent than for swelling. For the equipment trials represented by the data of the plot 400, breathing increased from 1 percent to approximately 1.6 percent. In comparison to swelling, breathing became less responsible for total increase with respect to an increase in number of cycles. For example, for 0 to 10 cycles, breathing and swelling each contributed approximately 50 percent of the total increase of 2 percent; whereas, for 800 to 1000 cycles, breathing contributed less than 20 percent of the total increase of approximately 14 percent. The data of the plot 400 demonstrate that breathing and swelling phenomena differ and that "normal" swelling contributes more to an increase in thickness of a battery over a number of cycles (e.g., greater than 10 cycles) when compared to breathing.

Figure 5:
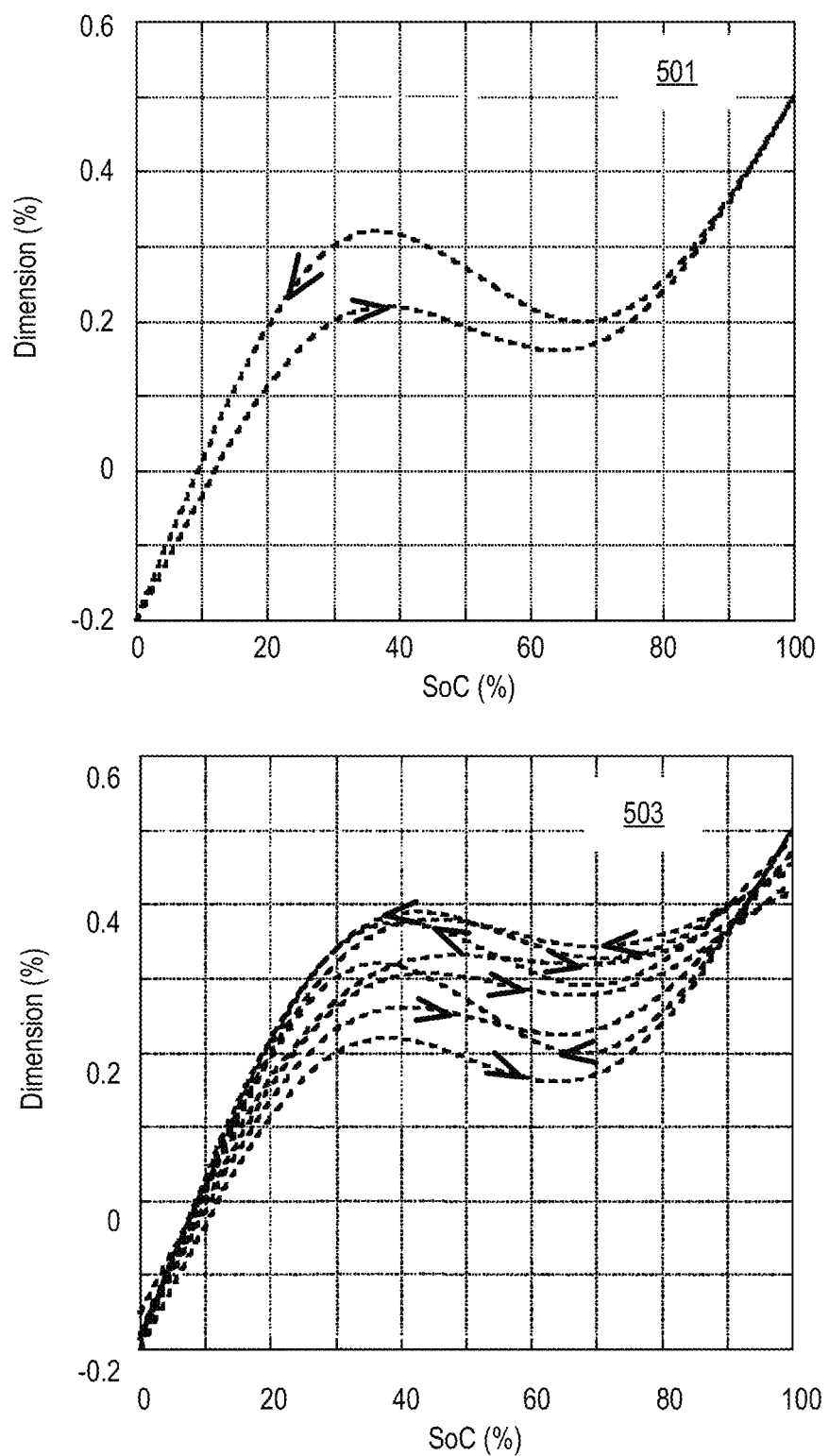
FIG. 5 is a series of diagrams of plots of changes in dimension with respect to state of charge (SOC)

FIG. 5 shows example plots 501 and 503 for dimension (e.g., thickness) versus SOC, both given in terms of percent. Arrows in the plots 501 and 503 indicate directions of charge and discharge. The plot 501 is for a fresh battery (e.g., a first cycle or cycle number less than 10) and the plot 503 is for cycles up to 300 where the highest curves (greatest change in dimension) are for discharge portions of a cycle. As shown in FIG. 5, the greatest dimension is for SOC of 100 percent, noting that at SOC of 0 percent, some shrinkage may occur (e.g., contraction).

Figure 6:
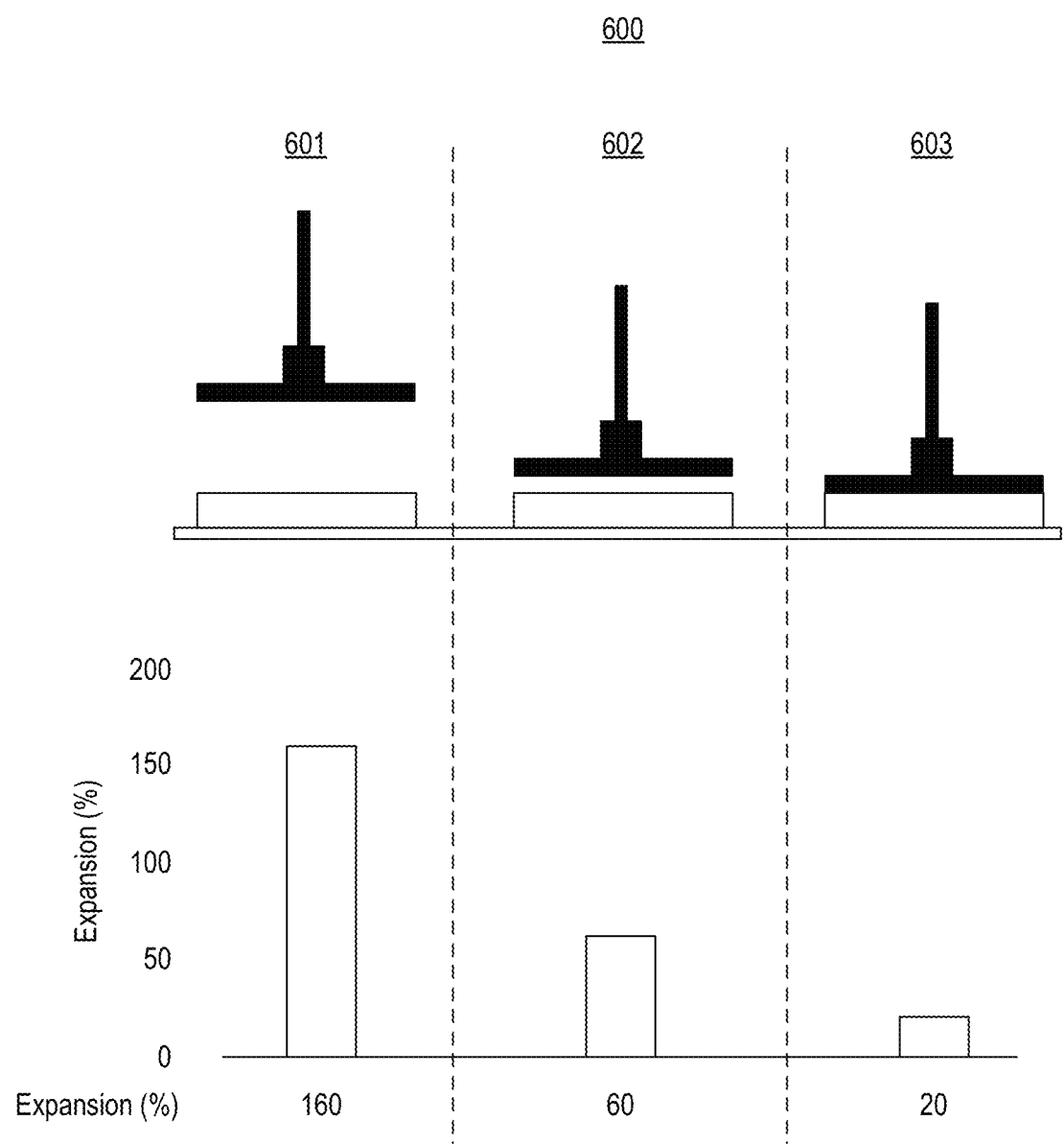
FIG. 6 is a diagram of trials and associated data.

FIG. 6 shows examples of trials 601, 602 and 603 with respect to clearance and swelling. For the trial 601, no restriction (e.g., unlimited gap) was applied with respect to a battery, for the trial 602, a 7 percent clearance (e.g., 7 percent gap) was applied with respect to a battery, and for the trial 603, no clearance (e.g., contact) was applied with respect to a battery. As shown, for the trial 601, expansion was 160 percent, for the trial 602, expansion was 60 percent, and for the trial 603, expansion was 20 percent. The data in FIG. 6 demonstrate that restriction can reduce swelling. As an example, restriction can include contact and may include application of an amount of force (e.g., a pre-load). As an example, a pre-load may help to assure that a gap does not form where changes in temperature, etc., occur. For example, a certain amount of pre-load may help to assure that contact exists, which may also reduce movement of one or more components, etc.

Figure 7A:
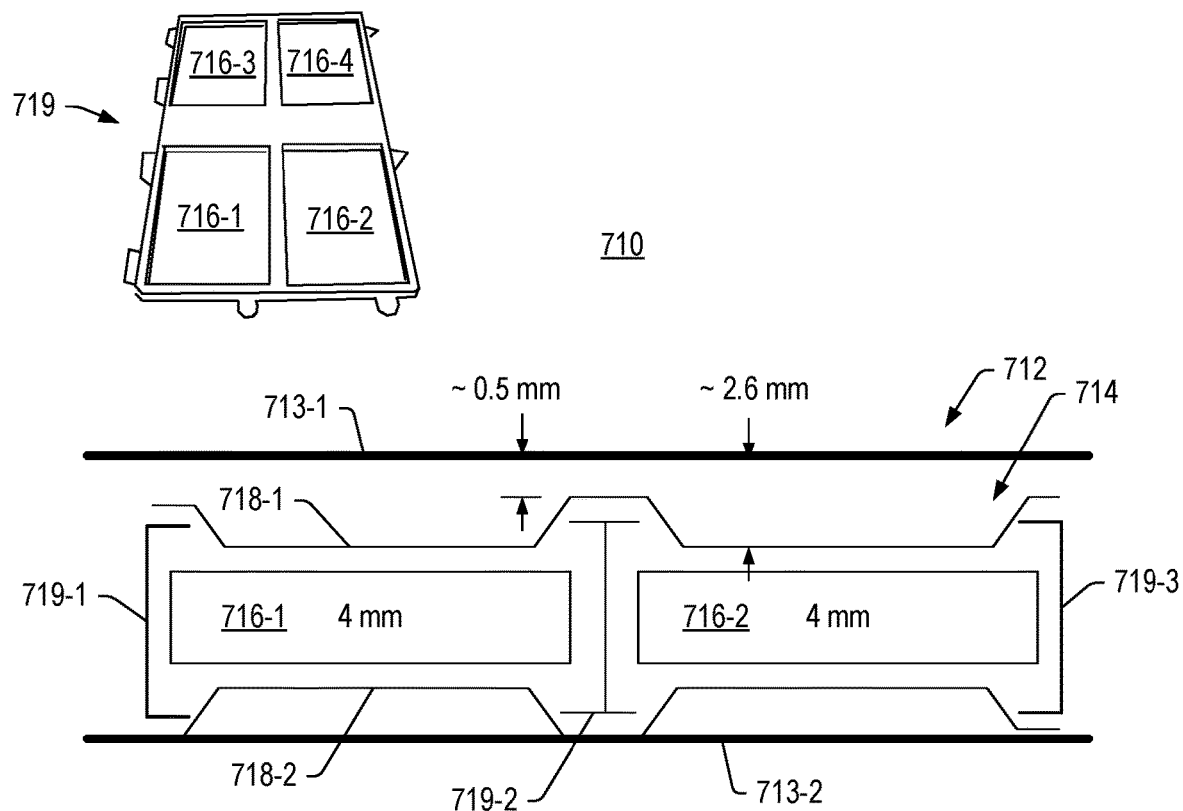
FIGS. 7A and 7B are a series of diagrams of examples of assemblies.
Figure 7B:
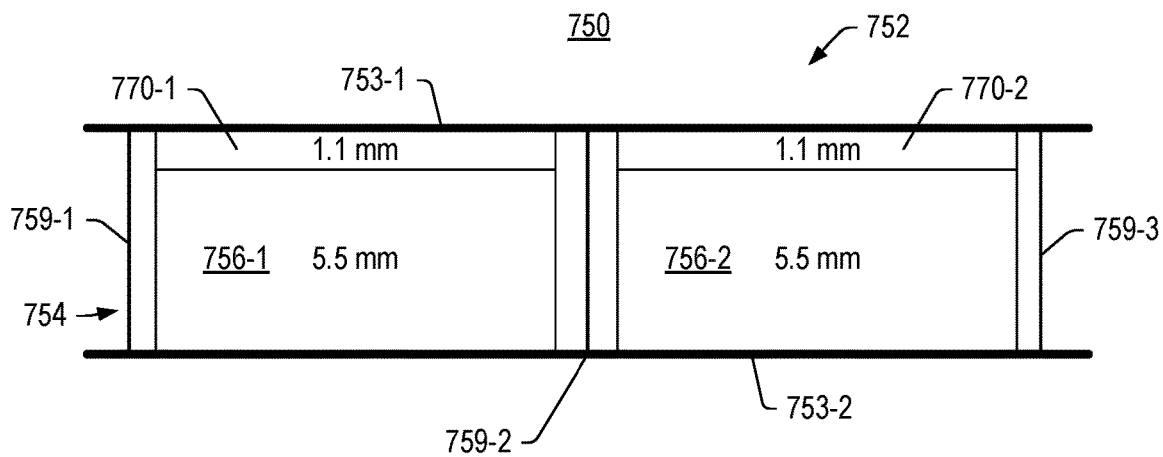

FIG. 7A show an example of an assembly 710 and FIG. 7B shows an example of an assembly 750. In FIG. 7A, the assembly 710 includes a battery bay 712, defined at least in part by opposing walls 713-1 and 713-2, and a battery package 714 that includes battery cell stacks 716-1, 716-2, 716-3 and 716-4 as well as features of the battery package 714, which include polyester resin layers 718-1 and 718-2 and a support 719, which can be seen in a cross-sectional view to include supports 719-1, 719-2 and 719-3 (e.g., as members of the support 719). As an example, the polyester resin layers may be MYLAR material.

In FIG. 7A, the assembly 710 shows various examples of dimensions. For example, consider a gap for the polyester resin layer 718-1 of approximately 0.5 mm over an end of the middle support 719-2 to the wall 713-1 and a gap for the polyester resin layer 718-1 of approximately 2.6 mm over the battery cell stack 716-2 to the wall 713-1.

In FIG. 7B, the assembly 750 includes a battery bay 752, defined at least in part by opposing walls 753-1 and 753-2, and a battery package 754 that includes battery cell stacks 756-1 and 756-2, as well as features of the battery package 714, which can include polyester resin layers (see, e.g., the polyester resin layers 718-1 and 718-2) and supports 759-1, 759-2 and 759-3. As an example, polyester resin layers may be MYLAR material. The assembly 750 may include additional battery cell stacks and may include a support that includes various supports (e.g., as members) of the support (e.g., the supports 759-1, 759-2 and 759-3 may be portions of a unitary support).

The assembly 750 further includes resilient material 770-1 and 770-2 disposed between a surface of the battery cell stack 756-1 and a surface of the wall 753-1 and between a surface of the battery cell stack 756-2 and a surface of the wall 753-1.

As to dimensions, the resilient material 770-1 and 770-2 may optionally be partially compressed where further compression can occur, for example, upon expansion of the battery cell stack 756-1 and the battery cell stack 756-2. Further, where shrinkage (e.g., contraction) occurs, a partially compressed resilient material may expand while still being able to apply a load. In the example of FIG. 7B, the resilient material 770-1 and 770-2 are shown to be of a thickness of approximately 1.1 mm while the battery cell stack 756-1 and the battery cell stack 756-2 are shown to be of a thickness of approximately 5.5 mm, as a manufactured thickness.

In FIGS. 7A and 7B, where the walls 713-1 and 713-2 define a height of the battery bay 712 and where the walls 753-1 and 753-2 define a height of the battery bay 752 and where the heights are the same, the assembly 750 can accommodate one or more battery cell stacks that exceed the height(s) of the battery cell stacks 716-1 and 716-2 of the assembly 710. As shown, the battery cell stacks 756-1 and 756-2 can each be approximately 1.5 mm greater than each of the battery cell stacks 716-1 and 716-2. In such an example, energy density can be increased. As an example, alternatively, the height of the battery bay 752 may be decreased while keeping the 4 mm thickness of the battery cell stacks 716-1 and 716-2, which can allow for manufacture of a thinner device (e.g., a mobile device that is approximately 1.5 mm thinner while maintaining the same battery rating).

As an example, a resilient material may be of a thickness that is approximately 1 percent to approximately 50 percent of a thickness of a battery (e.g., a battery cell or a battery cell stack). For example, the assembly 750 includes the resilient material 770-1 and 770-2 at a thickness of approximately 20 percent of the thickness of the battery cell stack 756-1 or the battery cell stack 756-2. As mentioned, such a thickness can be a partially compressed thickness where the resilient material is compressed a desired amount from its free standing state (e.g., uncompressed state).

As an example, a resilient material may be characterized by an equation such as $F=kz$, where k is akin to a spring constant (e.g., or spring function). In such an example, for a given change in z (e.g., an amount of compression that causes surfaces of a resilient material to be closer together), an approximate force may be calculated, which can be associated with a targeted load that is to be applied to battery in a battery bay of a device. The equation $F=kz$ may be written as $F=-kz$, for example, depending on how z is defined and/or how k is defined and/or how F is defined. As an example, k may be dependent on amount of compression, temperature, etc. As an example, k may be known a priori such that the resilient material can be expect to behave in a desired manner.

Various parameters can define a resilient material. For example, Young's modulus may be utilized to define a resilient material. As an example, a resilient material may be defined via hardness such as, for example, a Shore hardness.

A durometer is an instrument that can be used to measure hardness of a material. A durometer may generate measurements according to a scale where, for example, higher numbers indicate harder materials; lower numbers indicate softer materials. A durometer can measure hardness via resistance to indentation. The term durometer can refer to a scale or an instrument, which may characterize or be used to characterize, respectively, hardness of materials such as one or more of polymers, elastomers, and rubbers.

Figure 8:
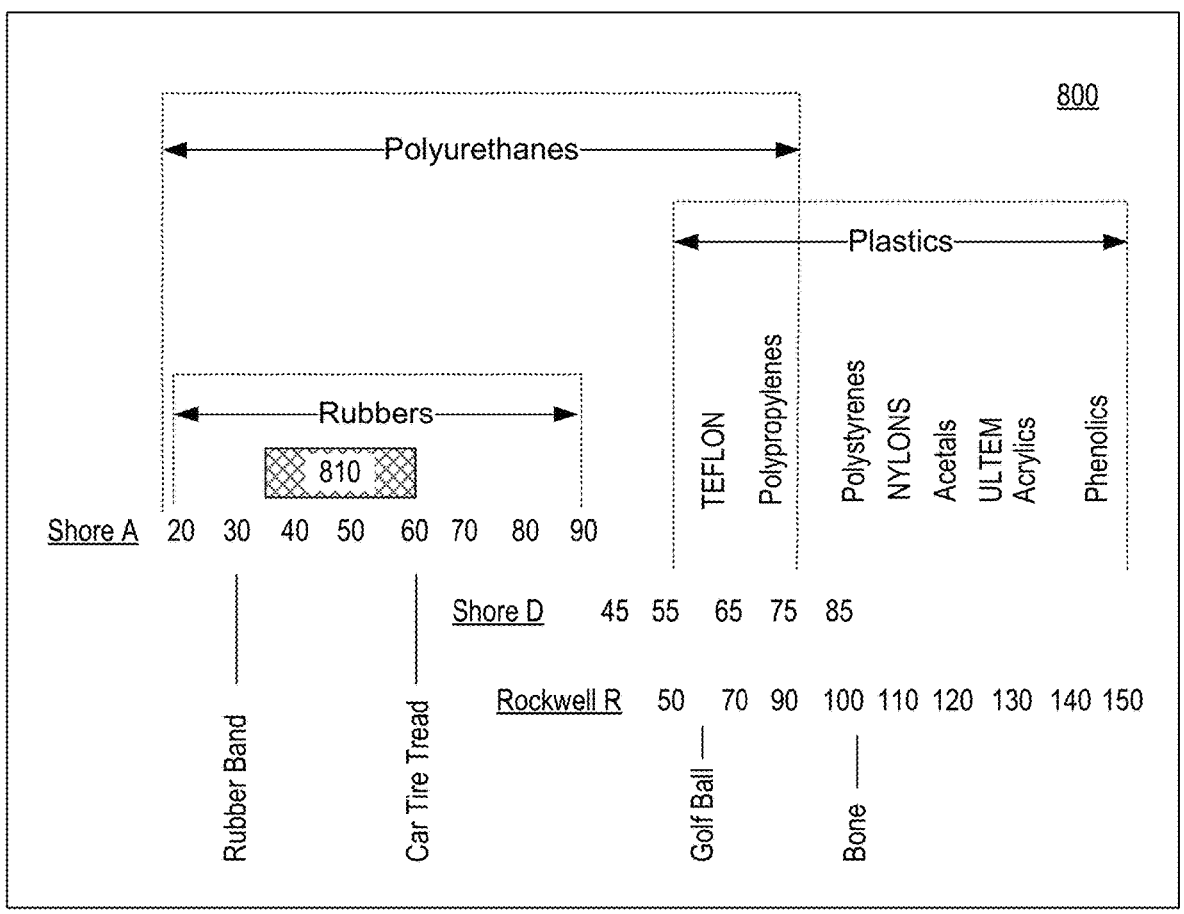
FIG. 8 is a series of diagrams of examples of material properties.

FIG. 8 shows a graphic 800 of three scales, which include Shore A, Shore D and Rockwell R. Various examples of materials are also shown in the graphic 800. As an example, a resilient material may be selected from a material that can have a hardness along the Shore A scale. For example, consider the bar 810 as representing a range from approximately 30 to approximately 60 on the Shore A scale, which may correspond to materials at a lower end such as a rubber band and at the upper end such as a car tire tread (e.g., a material that is harder than the material of the rubber band). As shown in FIG. 8, materials that correspond to the bar 810 include some rubbers and some polyurethanes.

FIG. 8, also shows an example of a plot 820 of force versus percent compression for silicone foam (e.g., silicon foam rubber), which is a synthetic resilient material. As shown, force increases as percent compression increases where various portions may be characterized as being linear and where, for example, the behavior may be modeled as a function (e.g., polynomial, exponential, log, etc.).

As an example, a resilient material may be a rubber or a polyurethane or, for example, a blend of materials that include one or more rubbers and/or one or more polyurethanes. As an example, a silicone foam may be made of constituent components that evolve hydrogen gas, which causes bubbles to form within the material, as it changes from liquid to solid. Such bubbles can result in an outward pressure, noting that temperature and humidity can influence the rate of expansion.

As an example, a resilient material may be a foam. As an example, consider foam rubber and/or polyurethane foam.

Polyurethane (PUR and PU) is a polymer composed of organic units joined by carbamate (urethane) links. While most polyurethanes are thermosetting polymers that do not melt when heated, thermoplastic polyurethanes are also available. Polyurethane polymers may be formed by reacting a di- or poly-isocyanate with a polyol. Both the isocyanates and polyols used to make polyurethanes contain, on average, two or more functional groups per molecule.

Polyurethane foam and/or foam rubber may be made using some amount of blowing agent(s), for example, to give less dense foam, better cushioning/energy absorption or thermal insulation.

As an example, a resilient material can be or include closed-cell acrylic foam. As an example, a resilient material can include a core with an adhesive on one side of the core or on both sides of the core. As an example, a resilient material can be or include a closed-cell acrylic foam with an adhesive on one side or on both sides. As an example, an adhesive may be an acrylic adhesive.

As an example, a resilient material can be or include a foamed elastomer. As an example, a foamed elastomer may be a foam that includes cells, which may be closed, open or a combination of closed and open.

As an example, closed-cell foam can include gas trapped in closed cells where an increase in temperature can result in an increase in pressure and/or volume of the gas in a closed cell (e.g., PV=nRT). As an example, where a device generates heat energy, such heat energy may increase the temperature of gas in closed cells of a closed-cell foam. Such an increase may cause the foam to exert force when the foam is disposed between two surfaces. As an example, such force may be utilized to help reduce swelling or otherwise limit swelling. As an example, a foam may be selected to have a percentage of open cells and a percentage of closed cells, which may run along a spectrum from 0 percent to 100 percent. As an example, a foam may be tailored as to its behavior via a percentage of open and closed cells. As an example, a closed cell foam may be processed (e.g., chemically, mechanically, etc.) to cause at least some of the closed cells to become open cells. As mentioned, an equation F=kz may be utilized to characterize a resilient material. In such an example, k may depend on percentage of open cells and/or closed cells.

As an example, a resilient material can be elastic in that elastic deformation can occur such as compressional deformation where the resilient material can contract and expand responsive to cycling of force. For example, consider the plots 501 and 503 of FIG. 5 where changes in dimension occur with respect to charge and discharge. As an example, a resilient material may be rated to be elastic over a range of compressional force as applied cyclically. For example, consider a material rated to be elastic for an amount of force of 100 N (e.g., 22.5 lb).

As mentioned, in some situations, a battery package can swell and apply force that splits or otherwise damages a device. As an example, a resilient material can be in a compressed state and apply a force that is less than approximately 200 N or less than approximately 100 N where the resilient material may cycle with changes in dimension of a battery package and may reduce swelling of the battery package over the lifetime of the battery package (e.g., a number of cycles greater than approximately 100 cycles (see, e.g., the plot 400 of FIG. 4).

As mentioned, a resilient material may be provided as a mesh or another shape. As an example, a foam may be provided as a mesh or in another shape. As an example, one or more of a foam mesh, foam dots, foam bars, foam circles, etc., may be utilized for resiliency with respect to a battery in a battery bay.

Figure 9:
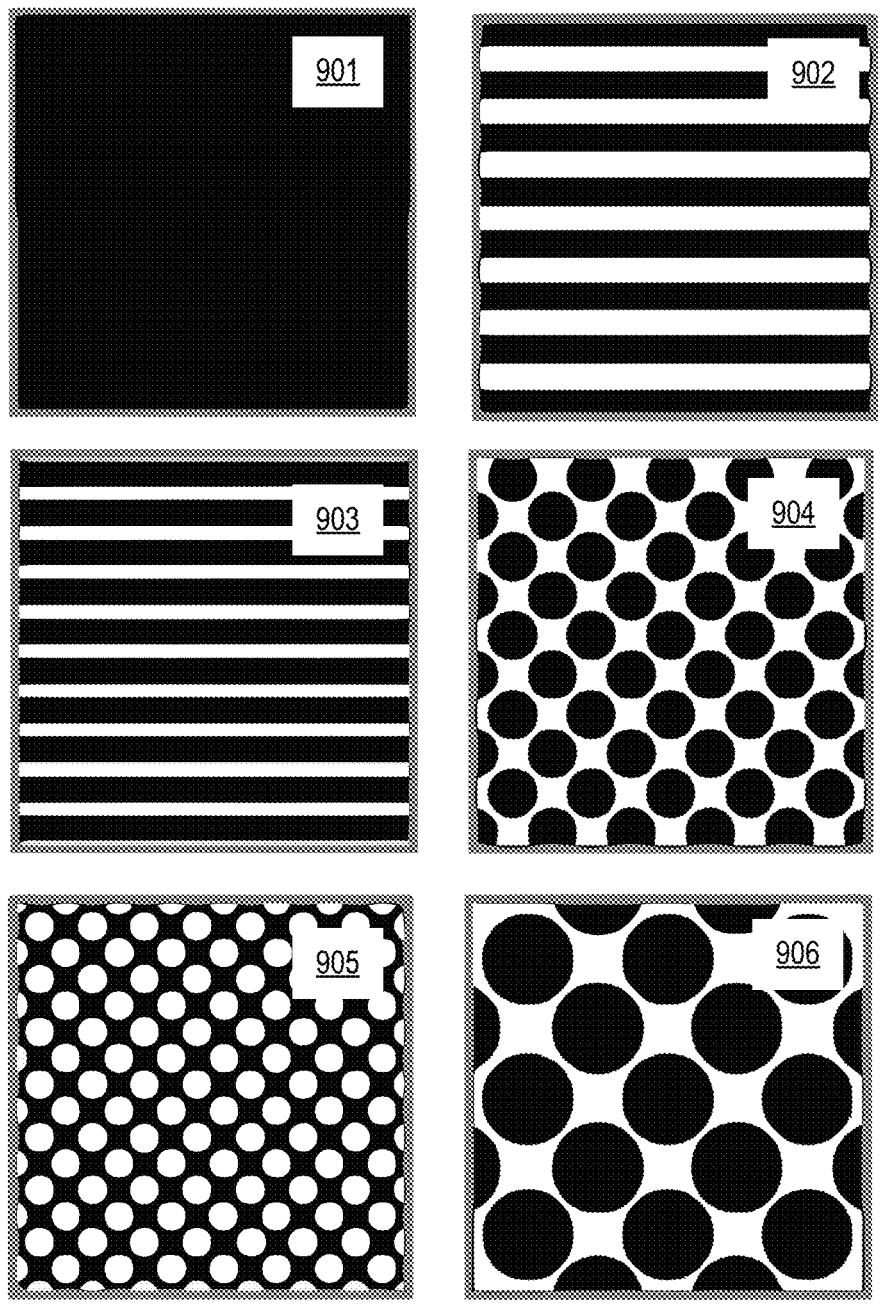
FIG. 9 is a series of diagrams of examples of patterns for material.

FIG. 9 shows some examples of patterns 901, 902, 903, 904, 905, and 906 that may be utilized for a resilient material or resilient materials such as, for example, in an assembly such as the assembly 750 of FIG. 7B. As to the patterns of FIG. 9, these are plan views where a height dimension (e.g., thickness) would be extending out of the page. In each example, the height dimension (e.g., thickness) may be determined via, for example, a percentage of a thickness of a battery in a manufactured state and/or in a most swollen operational state (e.g., a maximum expected amount of normal swelling for a number of cycles within a useful operational life).

In the examples of FIG. 9, the solid black can represent resilient material. As an example, a "dot" may be semispherical and/or cylindrical in shape. For example, consider a cylindrical portion with a semispherical cap.

As an example, a resilient material in a pattern may be compressed such that it can accommodate swelling of a battery in a battery bay and/or reduce swelling of a battery in a battery bay (e.g., via application of a load to the battery in the battery bay).

Figure 10:
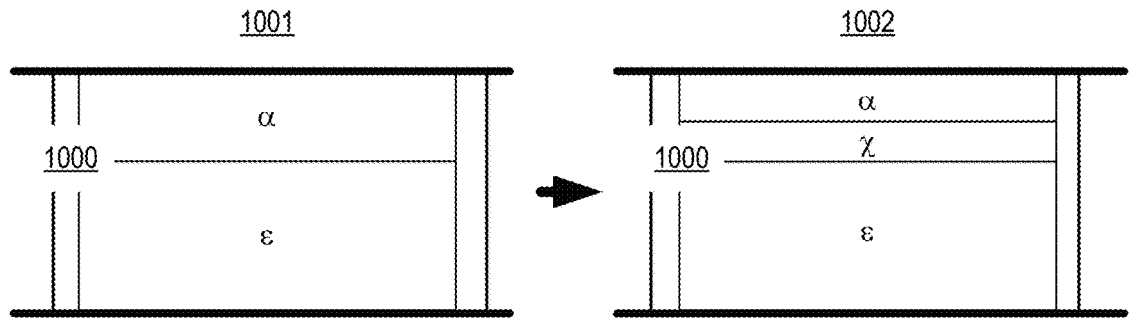
FIG. 10 is a series of diagrams of an example of an assembly in different states and a table of examples of values.

FIG. 10 shows an assembly 1000 in a first state 1001 and the assembly 1000 in a second state 1002 where, for example, the assembly 1000 may transition from the first state 1001 to the second state 1002.

The assembly 1000 includes various parameters, including $\alpha$, $\chi$ and $\varepsilon$. A table 1010 includes various examples with values. As shown, the values include cell thickness values as $\varepsilon$ (e.g., battery cell stack values for thickness in a manufactured state), adhesive foam layer compressibility values, pack thickness values and 50 percent compression values.

As to $\chi$, it may be calculated according to an equation that includes $\varepsilon$. For example, consider the following equation:

$$\chi = \frac{2}{100}\varepsilon$$

As an example, consider a battery rated at 52 Wh/l with a thickness of 4 mm including resin layer of 0.2 mm where a battery package has a thickness of 4.8 mm, including approximately 0.7 mm to approximately 0.9 mm clearance. In such an example, consider a total thickness of approximately 5.5 mm (e.g., 4.8+0.7). In such an example, without the resin layer of 0.2 mm, the total thickness is approximately 5.30 mm. Given the battery thickness of 3.8 mm without the resin layer of 0.2 mm, the clearance, in total, is approximately 1.5 mm (e.g., 5.3 mm−3.8 mm=1.5 mm). In such an example, 1.5 mm represents an amount of space that may be considered "non-active" with respect to battery rating (e.g., capacity).

As explained, through use of one or more resilient materials as, for example, gap filling material(s), a battery bay may be made smaller or a larger battery may be utilized (e.g., greater capacity) or a combination of the two with a balance therebetween that suits a particular device, use of the device, etc. Such an approach may, in particular, facilitate manufacture and use of mobile computing devices, which can be made to perform better, perform longer and/or be thinner.

Figure 11:
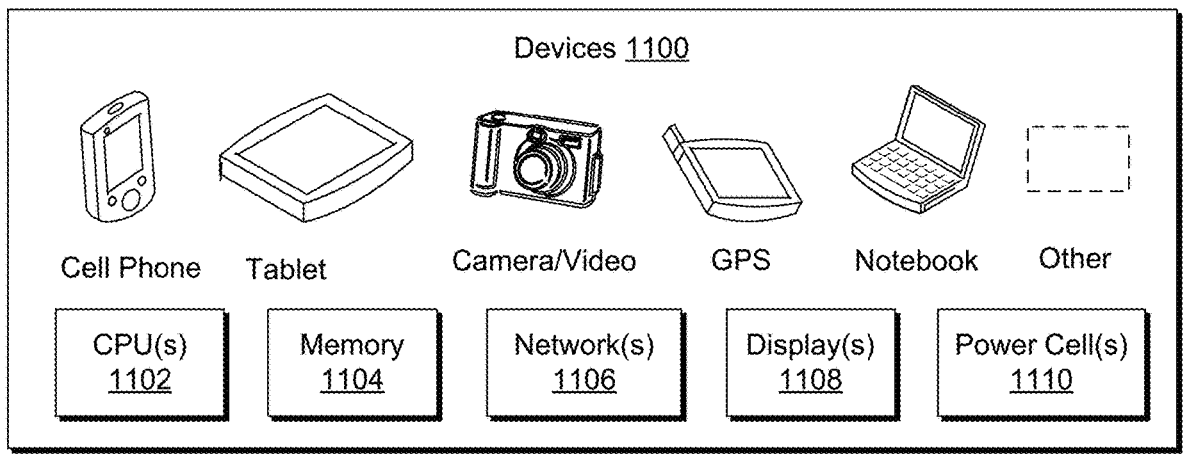
FIG. 11 is a diagram of examples of devices.
Figure 11:
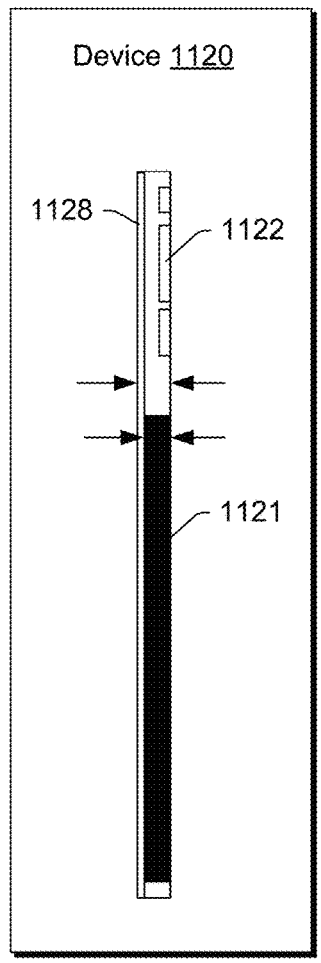

FIG. 11 shows some examples of devices 1100 that may be powered by a lithium-ion cell or cells (e.g., in the form of a lithium-ion battery or batteries). For example, a cell phone, a tablet, a camera, a GPS device, a notebook computer, or other device may be powered by a lithium-ion cell or cells. As to other devices, a device may be an electric motor of an electric vehicle or a hybrid vehicle. A device may be an automobile, a toy, a remote control device (e.g., a bomb sniffers, drones, etc.), etc. A device may include one or more processors 1102, memory 1104, one or more network interfaces 1106, one or more displays 1108 and, as a power source, one or more lithium-ion cells 1110.

As an example, a device 1120 may include a power cell(s) 1121, circuitry 1122 and, for example, a display 1128. In such an example, the thickness of the device 1120 may be determined largely by a thickness of the power cell(s) 1121. For example, about 80 percent of the overall thickness of the device 1120 may be determined by a thickness of the power cell(s) 1121.

As an example, one or more of the devices 1100 may include a resilient material disposed in a battery bay that can allow for breathing of a battery in a battery package and that can help to reduce swelling of the battery in the battery package.

As an example, a device can include a processor; memory accessible by the processor; a battery bay that includes a first surface and a second, opposing surface; a battery package disposed in the battery bay and operatively coupled to the processor; and a resilient material disposed between the battery package and at least one of the first surface and the second surface of the battery bay. In such an example, the resilient material can be in a compressed state. For example, the resilient material, in the compressed state, can apply a load to the battery package (e.g., a pre-load).

As an example, a resilient material may be in an uncompressed state in a device. As an example, a resilient material can be in contact with a surface or surfaces in a device. For example, one side of a resilient material can be in contact with one surface and another side of the resilient material can be in contact with another surface. As a battery in a battery package breathes, the resilient material can respond, for example, by compressing and expanding. Where such a battery swells, the resilient material can respond by compressing, which can increase applied force and, in a limited space, help to reduce swelling of the battery over its operational life.

As an example, a resilient material can be or include foam. As an example, a foam can include closed cells and/or open cells.

As an example, a height of a battery bay can be defined as a distance between a first surface and a second surface where a thickness of a battery package and a thickness of a resilient material equals the height of the battery bay. In such an example, the resilient material may be in a compressed state.

As an example, a resilient material can include an adhesive.

As an example, a resilient material can include a thickness that is less than a thickness of a battery package. For example, a resilient material may have a maximum thickness that is less than a thickness of a battery package. In such an example, the maximum thickness can be an installed thickness, for example, the thickness of the resilient material is a maximum thickness of the resilient material in the battery bay. As an example, a resilient material can include one or more openings. For example, a resilient material may be a mesh.

As an example, a thickness of a resilient material can be less than 60 percent of a thickness of a battery package.

As an example, a resilient material can have a thickness that is greater than approximately 0.5 mm and less than approximately 3 mm. In such an example, a battery package can have a thickness that is greater than approximately 2 mm and less than approximately 10 mm. In such examples, thickness can be maximum thickness.

As an example, a resilient material can be or include a rubber. As an example, a resilient material can be or include a polyurethane. As an example, a resilient material can be or include an acrylic foam. As an example, a resilient material can be viscoelastic.

As an example, a resilient material can be a viscoelastic acrylic foam that has a thickness less than or equal to approximately 3 mm (e.g., and greater than approximately 0.3 mm).

As an example, a resilient material can be a tape that includes adhesive. As an example, a resilient material can be a double-sided tape (DST) that includes foam disposed between layers of adhesive. In such an example, the foam may be a viscoelastic acrylic foam.

As an example, a method can include, in a device that includes a processor; memory accessible by the processor; a battery bay that includes a first surface and a second, opposing surface; a battery package disposed in the battery bay and operatively coupled to the processor; and a compressed resilient material disposed between the battery package and at least one of the first surface and the second surface of the battery bay, loading the battery package via the compressed resilient material. In such an example, the method can include, via the loading, reducing swelling of the battery package. As an example, swelling can be associated with charge-discharge cycling of a battery package for a number of cycles in excess of 10 cycles. As an example, a method can include compressing a resilient material during assembly of a device.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium. As an example, a computer-readable medium may be a computer-readable medium that is not a carrier wave.

Figure 12:
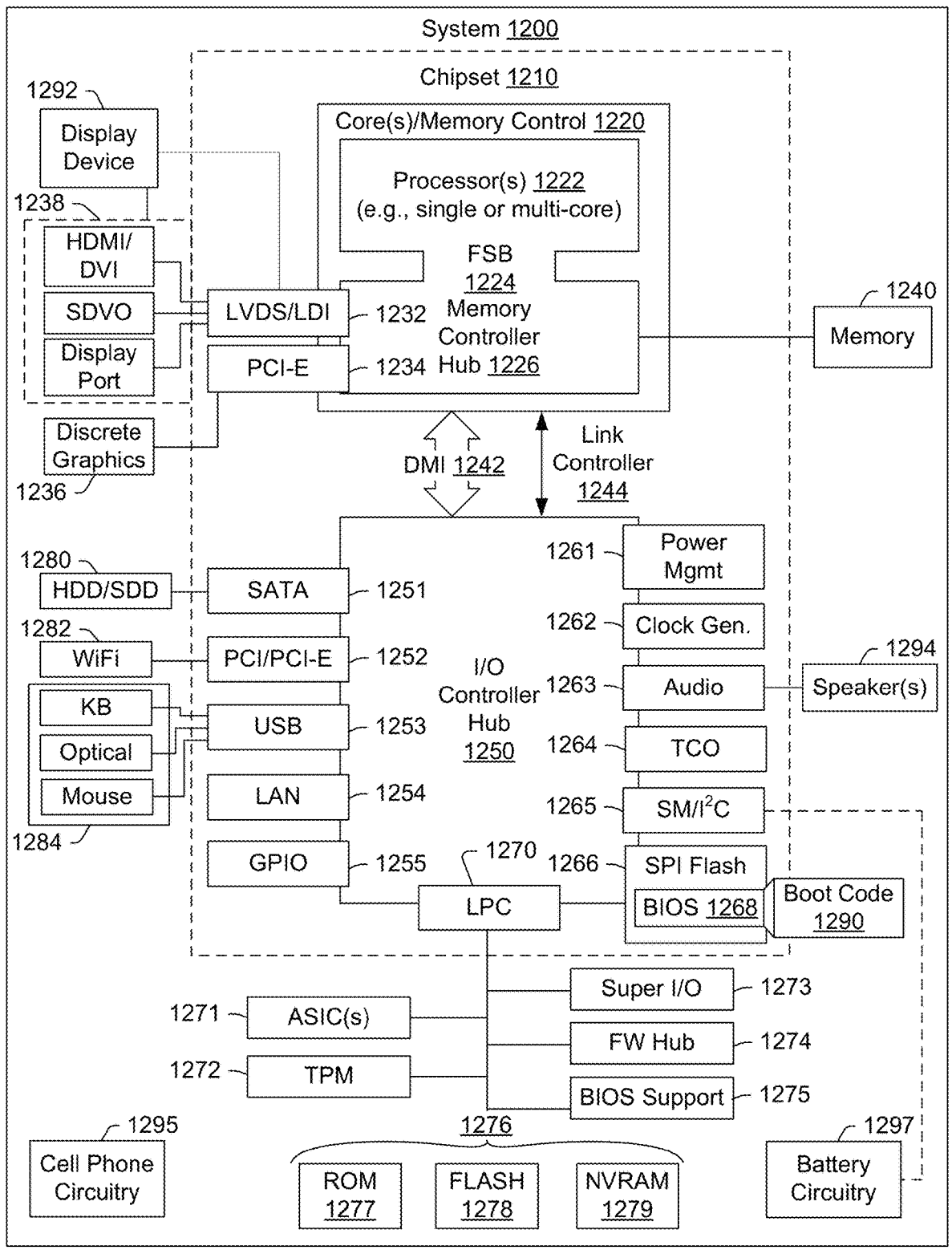
FIG. 12 is a diagram of an example of a system that includes one or more processors.

While various examples of circuits or circuitry have been discussed, FIG. 12 depicts a block diagram of an illustrative computer system 1200. The system 1200 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a satellite, a base, a server or other machine may include other features or only some of the features of the system 1200. As described herein, a device such as in FIG. 2, FIG. 3, FIG. 11, etc., may include at least some of the features of the system 1200.

As shown in FIG. 12, the system 1200 includes a so-called chipset 1210. A chipset refers to a group of integrated circuits, or chips, that are designed (e.g., configured) to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I²C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. Also shown in FIG. 12 is battery circuitry 1297, which may provide one or more battery, power, etc., associated features (e.g., optionally to instruct one or more other components of the system 1200). As an example, a SMBus may be operable via a LPC (see, e.g., the LPC interface 1270), via an I²C interface (see, e.g., the SM/I²C interface 1265), etc.

CONCLUSION

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A device comprising:
a processor;
memory accessible by the processor;
a battery bay that comprises a first surface and a second, opposing surface;

a battery package disposed in the battery bay and operatively coupled to the processor, wherein the battery package comprises a first package layer, a second, opposing package layer, a lithium-ion battery disposed between the first package layer and the second package layer; and a resilient foam material in a compressed state, disposed between the lithium-ion battery and at least one of the first package layer and the second package layer, that forcibly loads the lithium-ion battery via an expansion force of the resilient foam material in the compressed state, wherein the resilient foam material in the compressed state initially applies a pre-load force to the lithium-ion battery, wherein the resilient foam material comprises a hardness less than Shore A 60, wherein a height of the battery package is defined as a distance between the first package layer and the second package layer, wherein a sum of a thickness of the lithium-ion battery and a thickness of the resilient foam material in the compressed state equals the height of the battery package, wherein the resilient foam material applies force to the lithium-ion battery during expansion and contraction of cyclic breathing of the lithium-ion battery, wherein a lithium-ion battery thickness is between 3.5 mm and 5.5 mm, wherein a resilient foam material thickness is greater than or equal to 1.1 mm and less than or equal to 2 mm, and wherein the expansion and contraction of the cyclic breathing of the lithium ion battery is less than 2 percent of the lithium-ion battery thickness.

2. A method comprising:

in a device that comprises a processor; memory accessible by the processor; a battery bay that comprises a first bay surface and a second, opposing bay surface; a battery package disposed in the battery bay and operatively coupled to the processor, wherein the battery package comprises a first package layer, a second, opposing package layer, a lithium-ion battery disposed between the first package layer and the second package layer, and a resilient foam material in a compressed state, disposed between the lithium-ion battery and at least one of the first package layer and the second package layer, forcibly loading the lithium-ion battery via an expansion force of the resilient foam material in the compressed state, wherein the loading the lithium-ion battery via the resilient foam material in the compressed state initially applies a pre-load force to the lithium-ion battery, wherein the resilient foam material comprises a hardness less than Shore A 60, wherein a height of the battery package is defined as a distance between the first package layer and the second package layer, wherein a sum of a thickness of the lithium-ion battery and a thickness of the resilient foam material in the compressed state equals the height of the battery package, wherein the resilient foam material applies force to the lithium-ion battery during expansion and contraction of cyclic breathing of the lithium-ion battery, wherein a lithium-ion battery thickness is between 3.5 mm and 5.5 mm, wherein a resilient foam material thickness is greater than or equal to 1.1 mm and less than or equal to 2 mm, and wherein the expansion and contraction of the cyclic breathing of the lithium ion battery is less than 2 percent of the lithium-ion battery thickness.

3. The method of claim 2 further comprising, via the forcibly loading by the expansion force of the resilient foam material, reducing swelling of the lithium-ion battery wherein the swelling is associated with charge-discharge cycling of the lithium-ion battery for a number of cycles in excess of 10 cycles.

4. The method of claim 2 wherein the resilient foam material has an adhesive on at least a single side.

5. The method of claim 2 wherein the thickness of the resilient foam material in the compressed state is a maximum thickness of the resilient foam material in the battery package.

6. The method of claim 2 wherein the thickness of the resilient foam material in the compressed state is less than 60 percent of the thickness of the lithium-ion battery.

7. The method of claim 2 wherein the resilient foam material in the compressed state comprises a thickness that is greater than approximately 0.5 mm and less than approximately 2 mm.

8. The method of claim 2 wherein the resilient foam material comprises a rubber.

9. The method of claim 2 wherein the resilient foam material comprises a polyurethane.

10. The method of claim 2 wherein the resilient foam material is viscoelastic.

11. The method of claim 2 wherein the resilient foam material comprises a viscoelastic acrylic foam.

12. The method of claim 2 wherein the resilient foam material in the compressed state covers at least 50 percent of the area of a side of the lithium-ion battery to pre-load the lithium-ion battery in the battery package.

13. The method of claim 2 wherein the battery package comprises a rectangular footprint and a plurality of connector tabs that extend from the rectangular footprint.

14. The method of claim 13 wherein the resilient foam material has an adhesive on at least a single side.

15. The method of claim 2 wherein the resilient foam material in the compressed state eliminates gaps designed for normal swelling of the lithium-ion battery in the battery package.

16. The method of claim 2 wherein at least one of the first package layer and the second package layer comprises polyester resin.

17. The method of claim 2 comprising installing the battery package in the device, wherein the battery package comprises a screw tab and wherein the installing comprises securing the battery package to the device using a screw and the screw tab.

18. The device of claim 1, wherein the resilient foam material comprises a rubber.

19. The device of claim 1 wherein the resilient foam material comprises a polyurethane.

20. The device of claim 1, wherein the battery package comprises a footprint and a plurality of connector tabs that extend from the footprint.

* * * * *